(12) United States Patent
Miyazaki et al.

(10) Patent No.: US 10,944,311 B2
(45) Date of Patent: Mar. 9, 2021

(54) NOZZLE TURNING APPARATUS AND WINDING MACHINE

(71) Applicant: ODAWARA ENGINEERING CO., LTD., Kanagawa (JP)

(72) Inventors: Yuji Miyazaki, Ashigarakami-gun (JP); Noburo Miyawaki, Ashigarakami-gun (JP)

(73) Assignee: ODAWARA ENGINEERING CO., LTD., Kanagawa (JP)

(*) Notice: Subject to any disclaimer, the term of this patent is extended or adjusted under 35 U.S.C. 154(b) by 45 days.

(21) Appl. No.: 16/458,491

(22) Filed: Jul. 1, 2019

(65) Prior Publication Data

US 2019/0326802 A1    Oct. 24, 2019

Related U.S. Application Data

(63) Continuation of application No. PCT/JP2018/017000, filed on Apr. 26, 2018.

(30) Foreign Application Priority Data

May 31, 2017  (JP) .............................. JP2017-107600

(51) Int. Cl.
*H02K 15/00* (2006.01)
*H02K 15/095* (2006.01)
*B21F 3/02* (2006.01)

(52) U.S. Cl.
CPC ............ *H02K 15/095* (2013.01); *B21F 3/02* (2013.01)

(58) Field of Classification Search
CPC ............ H02K 15/0442; H02K 15/095; H02K 15/085; B21F 3/02; H01F 41/04; H01F 41/06

See application file for complete search history.

(56) References Cited

U.S. PATENT DOCUMENTS

| | | | | |
|---|---|---|---|---|
| 5,273,223 A | * | 12/1993 | Tsugawa | H02K 15/095 242/432.4 |
| 6,003,805 A | * | 12/1999 | Newman | H02K 15/095 242/432.5 |

(Continued)

FOREIGN PATENT DOCUMENTS

| | | |
|---|---|---|
| JP | 63-81670 U | 5/1988 |
| JP | 2-41419 U | 3/1990 |

(Continued)

OTHER PUBLICATIONS

International Search Report dated Jul. 24, 2018, issued in counterpart application No. PCT/JP2018/017000 (1 page).

*Primary Examiner* — Emmanuel M Marcelo
(74) *Attorney, Agent, or Firm* — Westerman, Hattori, Daniels & Adrian, LLP

(57) ABSTRACT

A nozzle turning apparatus includes a nozzle unit that has a nozzle for sending out a wire from a tip end thereof and a nozzle holder for holding the nozzle, the nozzle unit rotatably supporting the nozzle holder, and a nozzle-holder drive member integrally provided with the nozzle unit and moved in the nozzle unit to rotate the nozzle holder. The nozzle-holder drive member is driven to turn the nozzle from a winding state to a wire processing state after a winding operation is finished. Particularly, according to the present invention, the nozzle turning apparatus includes inner unit-drive means integrally provided with the nozzle unit in the nozzle unit, for moving the nozzle-holder drive member, and outer unit-drive means independently provided from the nozzle unit outside the nozzle unit, for driving the inner unit-drive means so as to move the nozzle-holder drive member.

11 Claims, 8 Drawing Sheets

(56) References Cited

U.S. PATENT DOCUMENTS

| | | | | |
|---|---|---|---|---|
| 6,098,912 | A | * | 8/2000 | Noji .................... H02K 15/0068 |
| | | | | 242/432.5 |
| 6,254,027 | B1 | * | 7/2001 | Kunou ................. H02K 15/095 |
| | | | | 242/432.4 |
| 6,532,645 | B1 | * | 3/2003 | Becherucci .......... H02K 15/022 |
| | | | | 29/596 |
| 2003/0061708 | A1 | * | 4/2003 | Becherucci .......... H02K 15/068 |
| | | | | 29/735 |
| 2006/0169822 | A1 | * | 8/2006 | Noji ..................... H01F 41/082 |
| | | | | 242/432.2 |
| 2009/0261194 | A1 | * | 10/2009 | Naitou ................. H02K 15/095 |
| | | | | 242/432 |
| 2019/0207489 | A1 | * | 7/2019 | Huber .................. H02K 15/095 |

FOREIGN PATENT DOCUMENTS

| | | | |
|---|---|---|---|
| JP | 2003-169455 | A | 6/2003 |
| JP | 2017-208920 | A | 11/2017 |

\* cited by examiner

NOZZLE TURNING APPARATUS AND WINDING MACHINE

FIELD OF THE INVENTION

The present invention relates to a nozzle turning apparatus used for a winding machine of the nozzle direct winding type and to the winding machine provided with this nozzle turning apparatus.

BACKGROUND ART

The winding machine of the nozzle direct winding type for directly winding a wire supplied via a nozzle onto a magnetic pole (work) such as a stator core winds the wire from the top end of the nozzle around the work by relatively moving the nozzle and the work. Such winding machine is configured to move the nozzle through which a wire is passed along the work and to wind the wire drawn from the tip of the nozzle directly around the work (for example Patent Documents 1 and 2). The movement of the nozzle is performed by relatively moving one or both of an arm for supporting the nozzle and a support mounting for supporting the work in the upper and lower direction. The direction of the nozzle is fixed in parallel with the radial direction of the core. According to such conventional winding machine of the nozzle direct winding type, in which the direction of the nozzle is fixed, when the winding operations of the wire around one core is finished and then forming and entwisting of a crossover wire are performed, the nozzle is moved toward the radial outward direction under the conditions where the direction of the nozzle is fixed. Thus, the wire may be bent to the opposite direction at the tip end of the nozzle and thereby it is impossible to expect smooth drawing of the wire from the nozzle causing the wire to be damaged.

Patent Document 1 discloses a constitution for solving such problem by using a rack driven in the upper and lower direction by means of an actuator and a gear attached to the rotation shaft of a nozzle holder and interlocked with the rack, for driving the actuator to rotate the nozzle at the time of the movement of the nozzle. That is, disclosed is a winding machine constituted to rotate the nozzle in the direction perpendicular to the radial direction of the core and to move the nozzle in this state to the radial outside direction of the core when forming and entwining the crossover wire.

Patent Document 2 also discloses a constitution for solving such problem by using an air cylinder with an axis penetrating in the nozzle unit and extending in the upper and lower direction of the nozzle unit, for sliding the axis to slide in the upper and lower direction so as to rotate the nozzle holder. That is, disclosed is a winding machine constituted to rotate the nozzle in the direction perpendicular to the radial direction of the core and to move the nozzle holder in this state to the radial outside direction of the core when forming and entwining the crossover wire.

RELATED ART DOCUMENT

Patent Document

Patent Document 1: Japanese Utility Model Publication No. Sho63-81670A

Patent Document 2: Japanese Patent Publication No. 2003-169455A

SUMMARY OF THE INVENTION

Problem to be Solved by the Invention

However, according to the winding machine disclosed in Patent Document 1, since the rotation of the nozzle at the winding operation is performed by the movement of the nozzle unit, it is required to additionally use a drive source (actuator) for driving the nozzle unit. As a result, the weight of the nozzle unit itself increases, and a high-power drive source must be used as a mechanism for driving the nozzle unit in the upper and lower direction.

Also, according to the winding machine disclosed in Patent Document 2, since the rotation of the nozzle at the winding operation is performed by the movement of the nozzle unit, it is required to additionally use a drive source (air cylinder) for driving the nozzle unit. As a result, the weight of the nozzle unit itself increases, and a high-power drive source must be used as a mechanism for driving the nozzle unit in the upper and lower direction.

Means to Solve the Problem

It is therefore an object of the present invention to provide a nozzle turning apparatus and a winding machine provided with this nozzle turning apparatus, whereby weight increase of the nozzle unit can be prevented.

Another object of the present invention is to provide a nozzle turning apparatus and a winding machine provided with this nozzle turning apparatus, whereby downsizing and saving of energy of the winding machine can be expected.

According to the present invention, a nozzle turning apparatus includes a nozzle unit that has a nozzle for sending out a wire from a tip end thereof and a nozzle holder for holding the nozzle, the nozzle unit rotatably supporting the nozzle holder, and a nozzle-holder drive member integrally provided with the nozzle unit and moved in the nozzle unit to rotate the nozzle holder. The nozzle-holder drive member is driven to turn the nozzle from a winding state to a wire processing state after a winding operation is finished. Particularly, according to the present invention, the nozzle turning apparatus includes inner unit-drive means integrally provided with the nozzle unit in the nozzle unit, for moving the nozzle-holder drive member, and outer unit-drive means independently provided from the nozzle unit outside the nozzle unit, for driving the inner unit-drive means so as to move the nozzle-holder drive member.

Since the nozzle holder drive member is moved by the outer unit-drive means that is independently and separately provided outside the nozzle unit, most of the nozzle turning apparatus can be formed as a distinction constitution independent from the nozzle unit and thus the weight added to the nozzle unit can be reduced.

It is preferred that the inner unit-drive means includes a rotation member rotatably supported by the nozzle unit, for moving the nozzle-holder drive member, and a projected portion integrally provided with the rotation member, for rotating the rotation member, and that the outer unit-drive means includes an outer movement member having a concave portion that engages with the projected portion, for moving to rotate the rotation member, and a drive mechanism for moving the outer movement member.

It is also preferred that the outer movement member is configured to linearly move, that the concave portion of the outer movement member is constituted by an elongate groove or an elongate hole provided along a movement direction of the nozzle unit moves while a winding operation, and that a length of the elongate groove or the elongate hole is set to a value equal to or longer than a stroke of the movement of the nozzle unit while the winding operation.

It is further preferred that the projected portion is constituted by a cam follower.

It is still further preferred that the drive mechanism includes a rotation motor or a rotation air cylinder as a drive source.

According to the present invention, further, a winding machine is provided with a nozzle turning apparatus including a nozzle unit that has a nozzle for sending out a wire from a tip end thereof and a nozzle holder for holding the nozzle, the nozzle unit rotatably supporting the nozzle holder, and a nozzle-holder drive member integrally provided with the nozzle unit and moved in the nozzle unit to rotate the nozzle holder. The nozzle-holder drive member is driven to turn the nozzle from a winding state to a wire processing state after a winding operation is finished. Particularly, according to the present invention, the nozzle turning apparatus includes inner unit-drive means integrally provided with the nozzle unit in the nozzle unit, for moving the nozzle-holder drive member, and outer unit-drive means independently provided from the nozzle unit outside the nozzle unit, for driving the inner unit-drive means so as to move the nozzle-holder drive member.

It is preferred that the inner unit-drive means includes a rotation member rotatably supported by the nozzle unit, for moving the nozzle-holder drive member, and a projected portion integrally provided with the rotation member, for rotating the rotation member, and that the outer unit-drive means includes an outer movement member having a concave portion that engages with the projected portion, for moving to rotate the rotation member, and a drive mechanism for moving the outer movement member.

It is also preferred that the outer movement member is configured to linearly move, that the concave portion of the outer movement member is constituted by an elongate groove or an elongate hole provided along a movement direction of the nozzle unit moves while a winding operation, and that a length of the elongate groove or the elongate hole is set to a value equal to or longer than a stroke of the movement of the nozzle unit while the winding operation.

It is further preferred that the projected portion is constituted by a cam follower.

It is still further preferred that the drive mechanism includes a rotation motor or a rotation air cylinder as a drive source.

It is further preferred that the winding machine is configured to control the movement of the outer unit-drive means and the nozzle unit so that a position of the tip end of the nozzle will not displace while the turning operation of the nozzle.

Effect of the Invention

According to the present invention, because the weight increase of the nozzle turning constitution used for moving the nozzle unit can be restrained, a nozzle turning apparatus and a winding machine provided with the nozzle turning apparatus that contributes downsizing and saving of energy of the winding machine can be provided.

EMBODIMENTS FOR CARRYING OUT THE INVENTION

Hereinafter, an embodiment of a winding machine according to the present invention will be described with reference to drawings.

Figure 1:
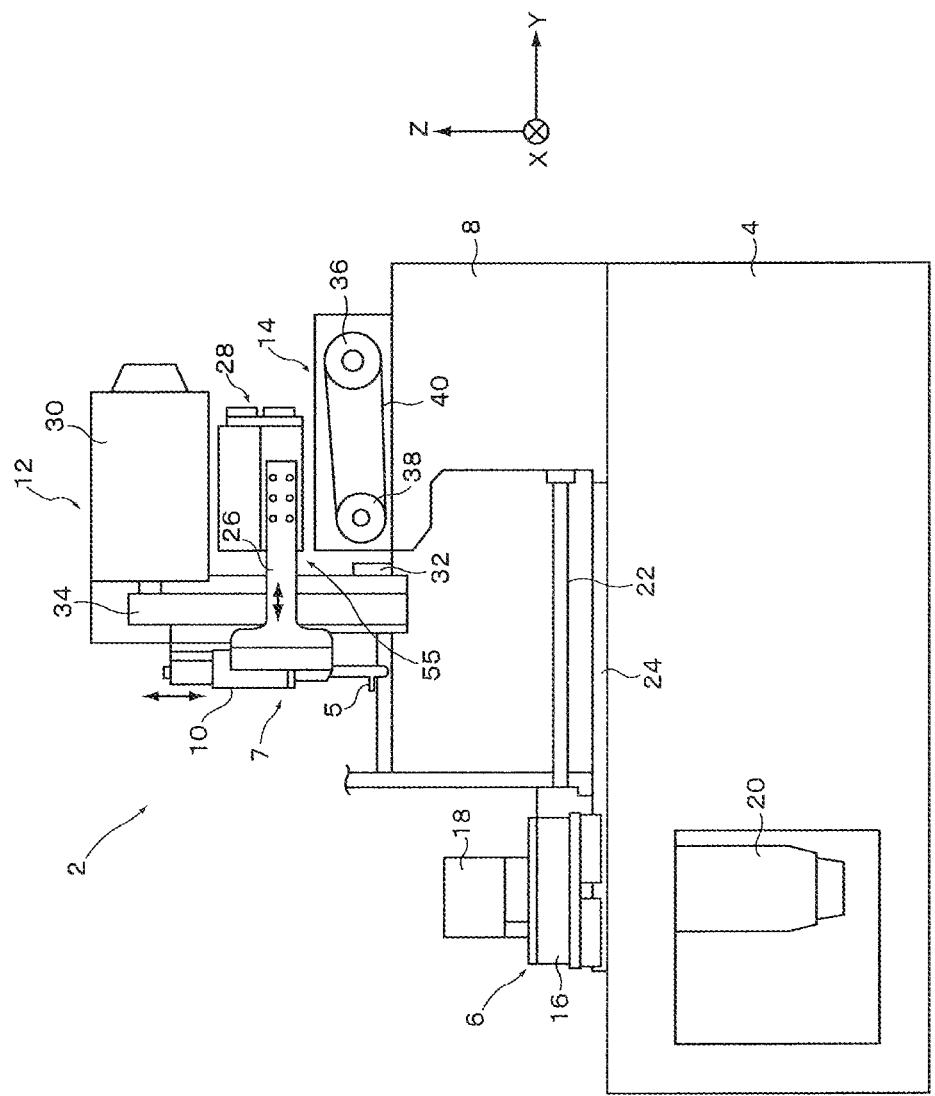
FIG. 1 is a front view schematically illustrating the whole constitution of a winding machine in an embodiment of the present invention.
Figure 2:
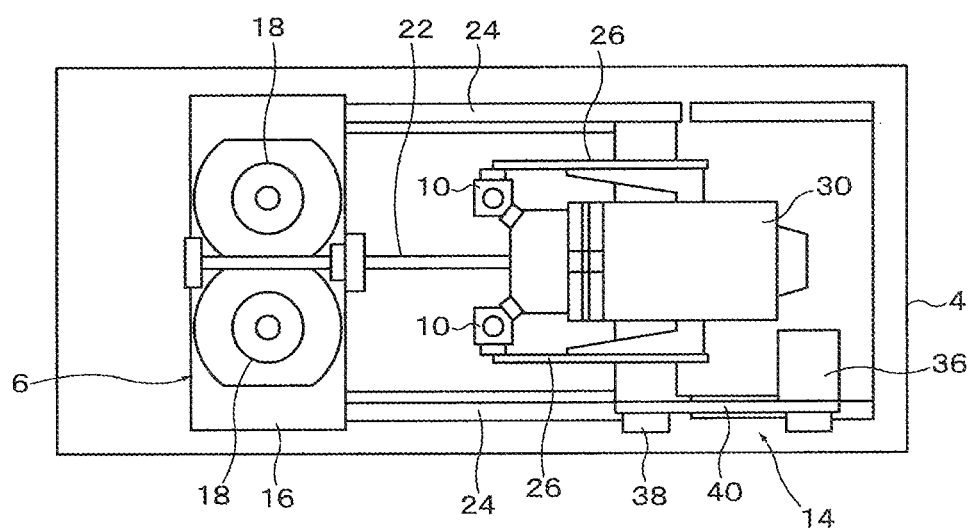
FIG. 2 is a plane view schematically illustrating the whole constitution of the winding machine in the embodiment of FIG. 1.
Figure 3:
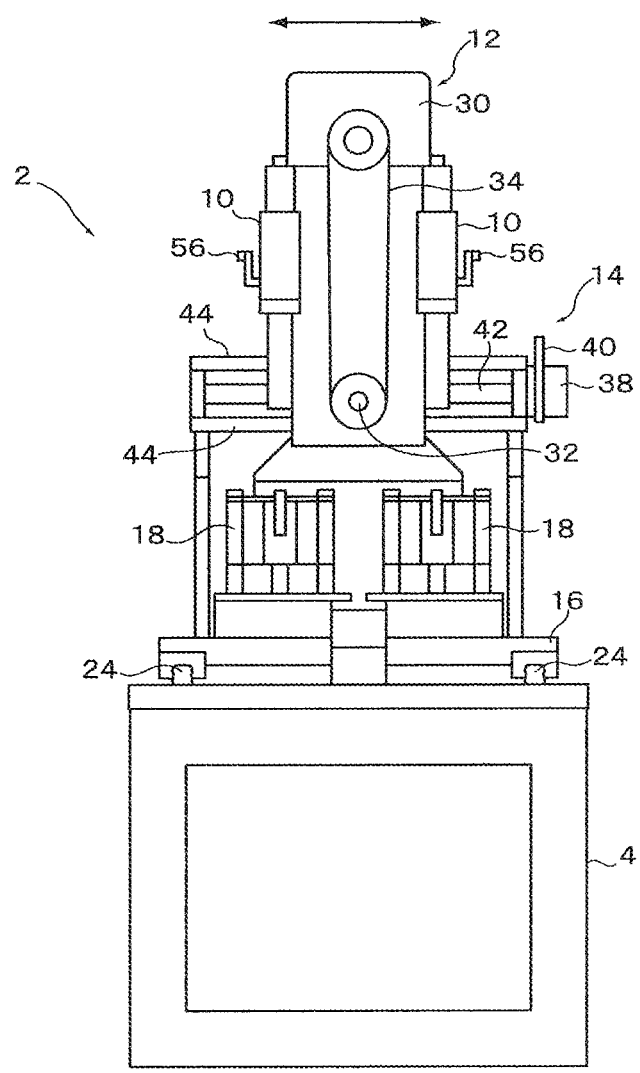
FIG. 3 is a side view schematically illustrating the whole constitution of the winding machine in the embodiment of FIG. 1.

FIG. 1 shows the front view of the whole constitution of a winding machine 2 in an embodiment of the present invention, FIG. 2 shows the plane view of the whole constitution of this winding machine 2, and FIG. 3 shows the side view of the whole constitution of this winding machine 2, respectively.

As shown in these figures, the winding machine 2 mainly has a base 4, a work holding unit 6 arranged on the base 2, two nozzle units 10 arranged above the base 2 via a vertical frame 8, two nozzles 5 respectively formed on the two nozzle units 10, two nozzle-turning apparatuses 7 for respectively rotating these nozzles 5, a nozzle-vertical movement mechanism 12 for moving the two nozzle units 10 in the upper and lower direction (rotation axis direction of work, Z direction) shown in FIG. 1, and a nozzle-horizontal movement mechanism 14 for moving the two nozzle units 10 in the horizontal front-back direction (X direction) shown in FIG. 1, which is perpendicular to the horizontal right and left direction (Y direction) shown in FIG. 1 and to the upper and lower direction (Z direction) shown in FIG. 1.

The work holding unit 6 has a work base 16, two work holding jigs 18 rotatably supported by the work base 16, and a motor 20 that is a drive source for simultaneously rotating these two work holding jigs 18. Namely, the winding machine 2 of this embodiment is a so-called twin type winding machine capable of winding two wires around the respective two works at the same time. The work holding unit 6 is movable in the horizontal right and left direction (Y direction) by a feed screw mechanism that has a feed screw 22, guide rails 24 and a drive source (not shown).

Each nozzle-turning apparatus 7 has an inner unit-drive means 54 (shown in FIG. 8) mounted in each of the nozzle units 10, and an outer unit-drive means 55 (shown in FIGS.

1 and 4) separately and independently formed from the nozzle unit 10 and located outside the nozzle unit 10, for driving the inner unit-drive means 54. The outer unit-drive means 55 has a T-shaped outer movement member 26 constituted to linearly move in the horizontal right and left direction (Y direction) that is perpendicular to the upper and lower direction (Z direction) and to the horizontal front-back direction (X direction), and a drive mechanism 28 for linearly driving this outer movement member 26.

The nozzle-vertical movement mechanism 12 has a rotation motor 30 that is the drive source, and a belt 34 wound around the rotation shaft of the motor 30 and a driven shaft 32 through pulleys. This nozzle-vertical movement mechanism 12 is constituted to move the nozzle unit 10 fixed to the belt 34 that is driven by the rotation of the motor 30 in the upper and lower direction.

The nozzle-horizontal movement mechanism 14 has a rotation motor 36 that is the drive source, a belt 40 wound around the rotation shaft of the motor 36 and a driven shaft 38 through pulleys, a feed screw 42, and guide rails 44 (shown in FIG. 3). This nozzle-horizontal movement mechanism 14 is constituted to integrally move both the nozzle-turning apparatus 7 and the nozzle-vertical movement mechanism 12 in the horizontal front-back direction (X direction).

Figure 4:
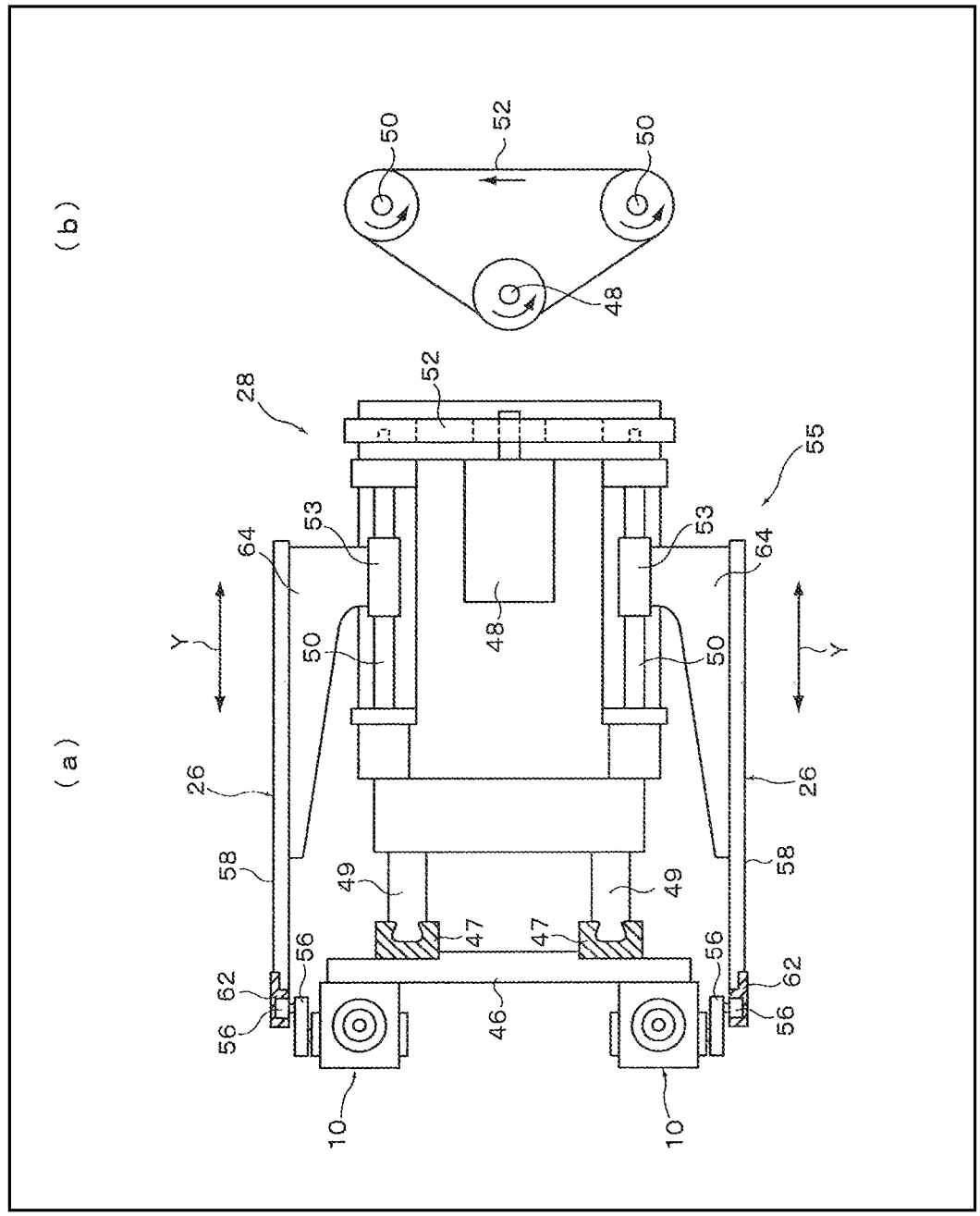
FIG. 4 is views illustrating the structure of an outer movement member of an outer unit-drive means and a nozzle unit of the winding machine in the embodiment of FIG. 1, wherein (a) shows a plane view and (b) shows a side view.
Figure 5:
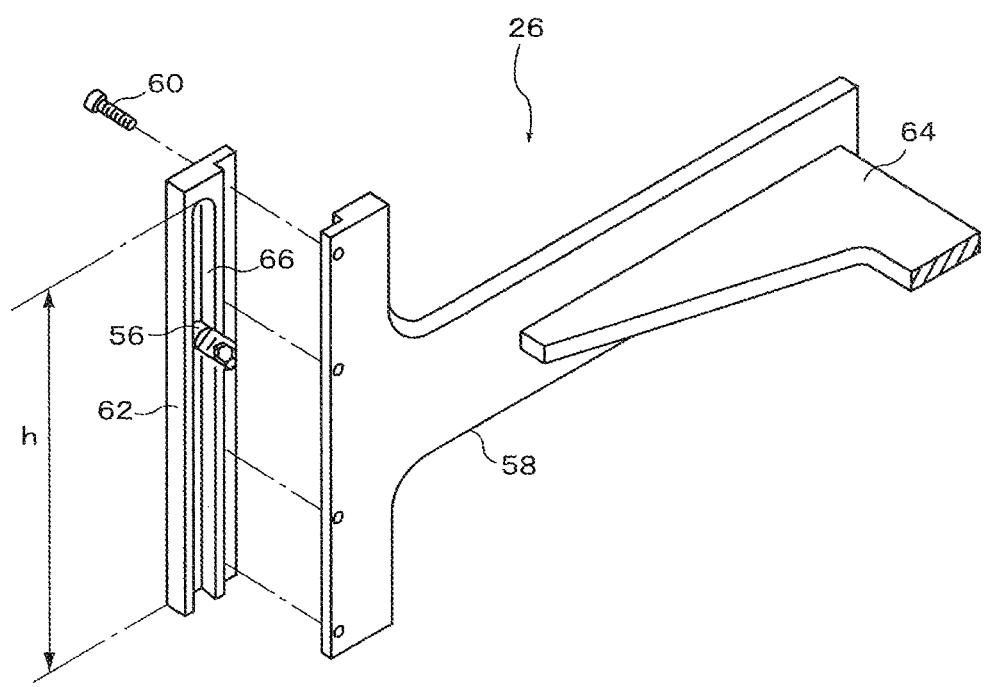
FIG. 5 is an exploded oblique view of the outer movement member of the winding machine in the embodiment of FIG. 1.

FIG. 4 shows the structure of the outer movement member 26 of the outer unit-drive means 55 and the nozzle unit 10, and FIG. 5 shows in detail the structure of the outer movement member 26.

As shown in FIG. 4, since the two nozzle units 10 are integrally fixed to a frame 46 and the frame 46 is fixed to the belt 34 of the nozzle-vertical movement mechanism 12, these two nozzle units 10 move in the upper and lower direction in response to the driving of the belt 34. In this case, these nozzle units 10 can be smoothly moved in the upper and lower direction by means of a linear motion guide constituted by sliding portions 47 fixed to the frame 46 and by guide rails 49.

The drive mechanism 28 of the outer unit-drive means 55 has a rotation motor 48, two feed screws 50 that are two driven shafts and a belt 52 wound around these feed screws 50 through pulleys. The outer movement members 26 are engaged to the feed screws 50 via nut members 53 respectively, and linearly moved by the rotation of the motor 48 in the horizontal right and left direction (Y direction) shown by the arrow. The top end of each outer movement member 26 is engaged to a cam follower 56 that is a projected portion of the inner unit-drive means 54 (shown in FIG. 8) provided in each nozzle unit 10.

As shown in FIGS. 4 and 5, the outer movement member 26 has a T-shaped support member 58, a guide plate 62 fixed to the top end portion of this support member 58 with a plurality of screws 60, and a bracket 64 for coupling the support member 58 and the nut members 53 with each other. A longitudinal groove (concave groove or elongate hole in the longitudinal direction) 66 that is an elongate groove or an elongate hole with which the cam follower 56 engages and slides is formed on the guide plate 62 along the upper and lower direction (Z direction), namely in the movement direction of the nozzle unit 10 while the winding operation. The lower end of the longitudinal groove 66 is opened so that the cam follower 56 can engage with the longitudinal groove 66 after the assembling of the apparatus. The length h (shown in FIG. 5) of this longitudinal groove 66 is set to a value equal to or longer than a stroke of the movement of the nozzle unit 10 while the winding operation.

Figure 6:
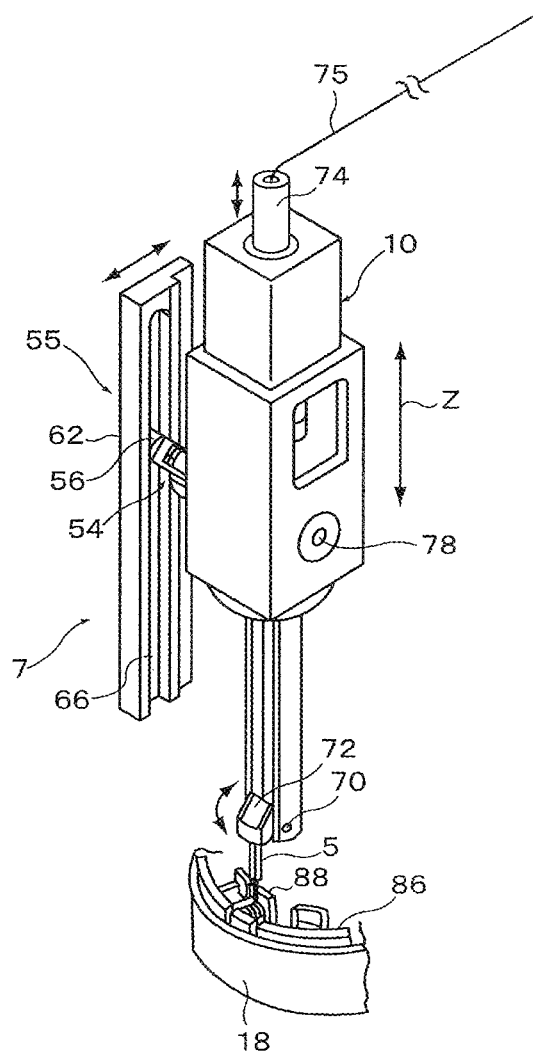
FIG. 6 is an oblique view illustrating the structure of the nozzle units and a nozzle-turning apparatus of the winding machine in the embodiment of FIG. 1.

FIG. 6 shows the structure of each nozzle unit 10 and each nozzle-turning apparatus 7 of the winding machine 2.

As shown in the figure, the nozzle unit 10 provided with the nozzle 5 for sending out a wire is moved in the rotation axis direction (upper and lower direction, Z direction) of a work 86 held by the work holding jig 18 and interlocked with the rotation movement of the work 86. Thus, the winding operation is performed. When the winding operation for one magnetic pole 88 is finished, the nozzle-holder drive member 74 moves downward in the rotation axis direction (Z direction) of the work within the nozzle unit 10 and the nozzle 5 moves and turns from the winding operation state (horizontal posture) for performing the winding operation to the wire processing state (vertical posture) for forming the crossover wire. FIG. 6 shows the state where the nozzle 5 has moved and turned in the wire processing state. It should be noted that, in this description, the expression of "the nozzle-holder drive member moves within the nozzle unit" may include a case where "the nozzle-holder drive member 74 moves by exposing a part of this nozzle-holder drive member 74 outside the nozzle unit 10".

The movement and turning from the winding operation state of the nozzle 5 to the wire processing state are performed by moving and turning the nozzle holder 72. The nozzle holder 72 is rotatably supported by a shaft 70 formed at the lower end portion of the nozzle unit 10. This nozzle holder 72 moves downward and rotates around the shaft 70 when the nozzle-holder drive member 74 moves downward in the upper and lower direction (Z direction). The lower end portion of the nozzle unit 10 a linear elongated shape so that the winding operation does not become difficult by possible interference of the nozzle 5 with the openings of the motor core. The movement in the upper and lower direction (Z direction) of the nozzle-holder drive member 74 is performed by interlocking operation of the inner unit-drive means 54 integrally formed within the nozzle unit 10 with the outer unit-drive means 55 independently and separately formed from the nozzle unit 10 outside this nozzle unit 10.

Figure 7:
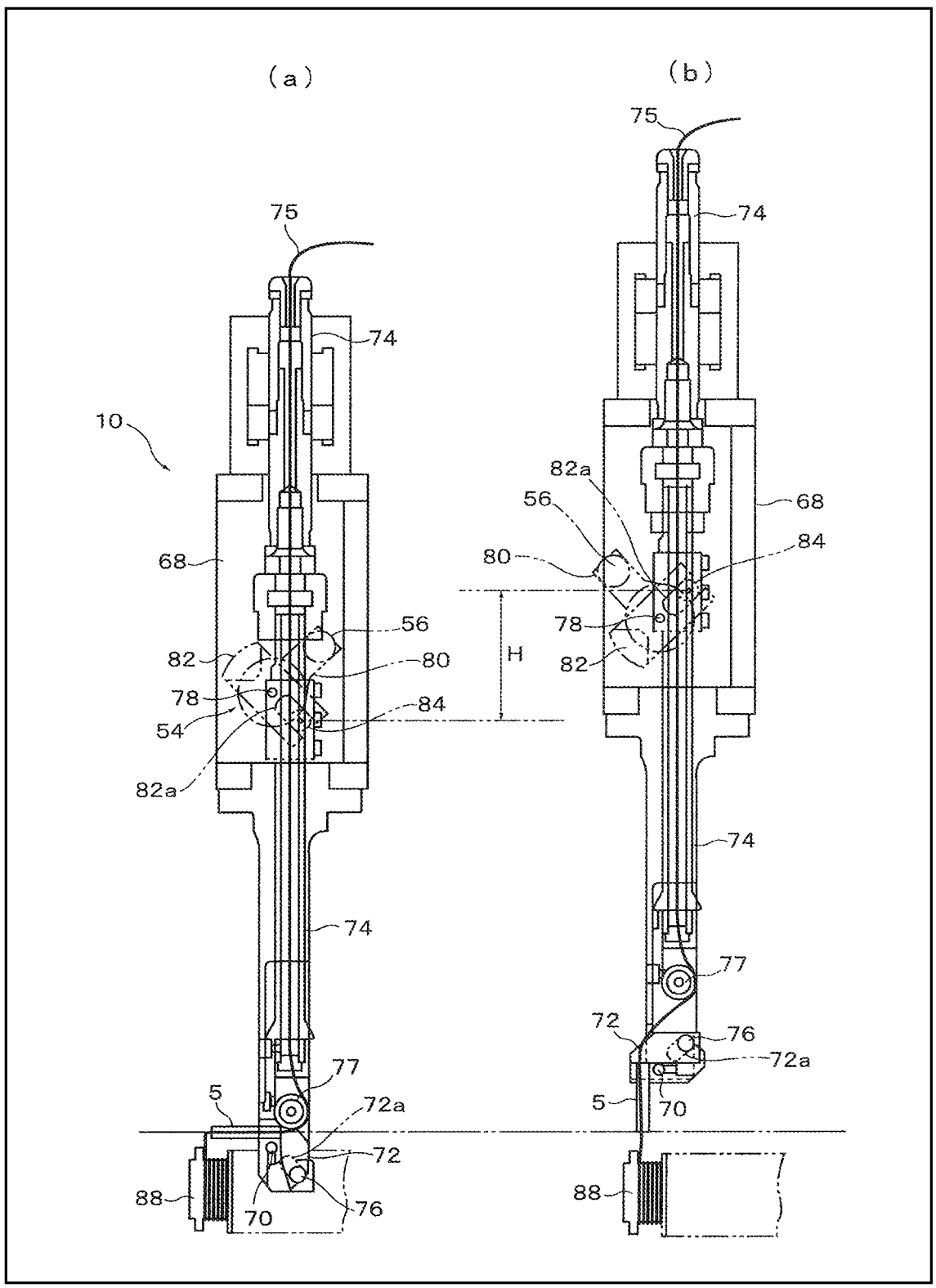
FIG. 7 is sectional views schematically illustrating the nozzle movement and turning operations of the nozzle unit of the winding machine in the embodiment of FIG. 1, wherein (a) shows the conditions of the nozzle for winding a wire and (b) shows the conditions of the nozzle for processing the wire.

FIG. 7 schematically shows moving and turning operations of the nozzle 5 in the nozzle unit 10 of the winding machine 2.

As shown in the figure, the nozzle unit 10 has a unit body 68, the nozzle holder 72 rotatably supported by the shaft 70 formed at the lower end portion of the unit body 68, and the nozzle-holder drive member 74. The nozzle-holder drive member 74 is movable in the upper and lower direction (Z direction) with respect to the unit body 68, and moves and turns the nozzle holder 72 to move and turn the nozzle 5 so as to change this nozzle 5 in the winding operation state (horizontal posture) or the wire processing state (vertical posture). A wire 75 given tension from a tension device (not shown) is inserted into an inner bore of the nozzle-holder drive member 74 via the upper end of this nozzle-holder drive member 74, and guided by a guide roller 77 provided in the lower end portion of the nozzle-holder drive member 74 to pass through the nozzle 5. As for the wire 75 of this case, a copper wire coated by an insulation layer may be used for example.

The nozzle holder 72 has an engagement groove 72a, and a pivot pin 76 provided in the lower end portion of the nozzle-holder drive member 74 is engaged with this engagement groove 72a. FIG. 7(a) shows the winding operation state (horizontal posture) of the nozzle 5. When the nozzle-holder drive member 74 moves upward from this winding operation state, the nozzle holder 72 moves upward and rotates in the counterclockwise direction around the shaft 70, and thus the nozzle 5 turns in the vertical plane depending upon this rotation of the nozzle holder 72 and moves upward, so that the nozzle 5 becomes the wire processing state (vertical posture) for forming the crossover wire as shown in FIG. 7(b).

The inner unit-drive means 54 is arranged at substantially center position of the upper and lower direction in the unit body 68. This inner unit-drive means 54 has a rotation member 82 rotatably and pivotally supported by a rotation shaft 78 provided in the unit body 68, and an arm member 80 integrally formed with this rotation member 82 and exposed from the outer surface of the unit body 68, for holding the cam follower 56. The rotation member 82 has an engagement slot 82a with which a pivot pin 84 provided in the nozzle-holder drive member 74 is engaged. When the arm member 80 rotates in response to the leaner movement (horizontal movement) of the outer movement member 26 (shown in FIG. 8), the rotation member 82 also rotates in synchronization so as to move the nozzle-holder drive member 74 in the upper and lower direction. In FIG. 7, the reference symbol H shows a movement stroke of the nozzle-holder drive member 74 depending upon the operation of the inner unit-drive means 54 (rotating operation of the rotation member 82).

Figure 8:
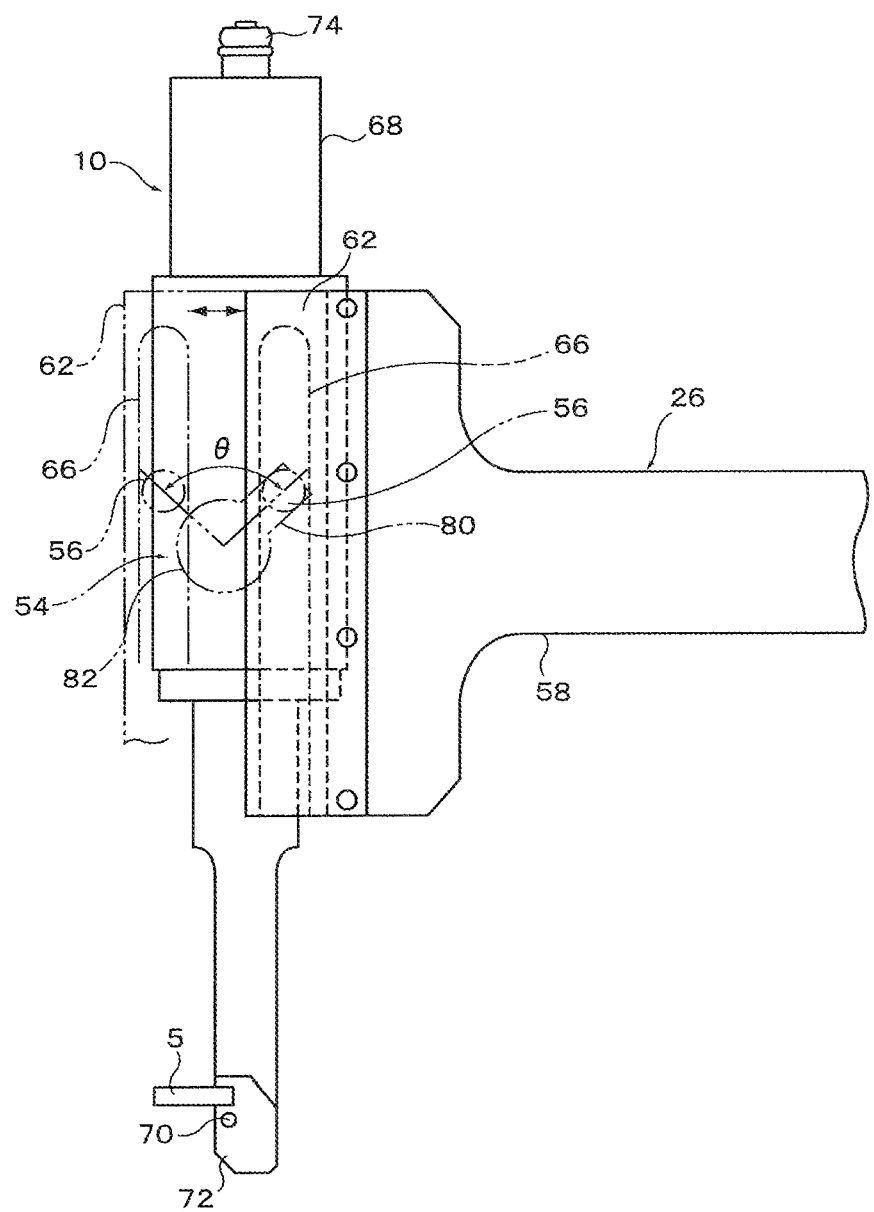
FIG. 8 is a front view illustrating the rotating operation of a rotation member of an inner unit-drive means, driven by the outer movement member of the winding machine in the embodiment of FIG. 1.

FIG. 8 shows the rotating operation of the rotation member 82 of the inner unit-drive means 54, driven by the outer movement member 26 of the winding machine 2.

As shown in the figure, when the outer movement member 26 linearly moves in the horizontal right and left direction, the cam follower 56 in the inner unit-drive means 54 will move with displacing the longitudinal groove 66 to the upper and lower direction. The rotation member 82 thus rotates by θ° (90 degrees), so that the nozzle-holder drive member 74 moves in the upper and lower direction for the movement stroke H (shown in FIG. 7). That is, when the cam follower 56 is located in the right side of θ° (90 degrees) in FIG. 8, the nozzle 5 is in the winding operation state (horizontal posture). Whereas when the cam follower 56 is located in the left side of θ° (90 degrees) in FIG. 8, the nozzle 5 is in the wire processing state (vertical posture). It should be noted that, in FIG. 8, the inner unit-drive means 54 and also the nozzle holder 72 are omitted to display. The motors used in this embodiment are not limited to the servomotors, but other kinds of motors may be adopted as for these motors.

The guide plate 62 of the outer movement member 26 may be configured by a member that is separated from and detachable to the support member 58. If the guide plate 62 is configured by such member, when the longitudinal groove 66 of the guide plate 62 is worn, it is possible to recover the problem of the worn groove by changing only this guide plate and thus the convenience in the maintenance can be enhanced. Also, if the guide plate 62 is configured by such member, it is easy to provide the longitudinal grooves 66 with different length by replacing only the guide plates. Furthermore, if the guide plate 62 is separated from the support member 58, when manufacturing the winding machine, formation of the longitudinal groove 66 becomes easy.

A rotary air cylinder can be used instead of the rotation motor 48 of the drive mechanism 28 in the outer unit-drive means. If the rotary air cylinder is used, a turning position of the nozzle 5 can be locked to provide not only functions of a drive source but also functions of locking means to fix the posture of the nozzle. In this case, since a position of the cam follower 56 of the inner unit-drive means 54 can be fixed, the load received from the longitudinal groove 66 of the guide plate 62 of the outer movement member 26 when the nozzle unit 10 moves in the upper and lower direction in the winding operation becomes reduced. As a result, the direct winding can be performed even when the tension of the wire is applied.

As mentioned before, since the winding machine 2 according to this embodiment is the twin type, two nozzle-turning apparatuses 7 are separately arranged for two nozzle units 10. Because the most elements of these nozzle-turning apparatuses 7 are independently provided outside of the nozzle units 10, the weight of the nozzle-turning apparatuses 7 is substantially not added to the nozzle units 10. Thus, the constitution of the nozzle-vertical movement mechanism 12 provided for moving the nozzle unit 10 in the upper and lower direction can be simplified. Also, since the output of the motor of the nozzle-vertical movement mechanism 12 can be reduced, energy conservation and reduction of the running cost can be expected.

Because the cam follower 56 of the inner unit-drive means 54 is regulated by the longitudinal groove 66 of the guide plate 62 of the outer movement member 26, it is possible to turn the nozzle 5 by straightly moving the outer movement member 26 even when the nozzle unit 10 is located at any position. As aforementioned, since the length h of this longitudinal groove 66 is set equal to or larger than the moving stroke of the nozzle unit 10 at the winding operation, it is possible to perform the winding operation by moving the nozzle unit 10 in the upper and lower direction in succession after the turning operation of the nozzle 5.

The winding machine may be constituted by providing a horizontal lateral groove (lateral concave groove or lateral via hole) extending in the straightly moving direction (horizontal moving direction) instead of the longitudinal groove 66 and by engaging the cam follower 56 with this lateral groove so as to rotate the rotation member 82. However, in this case, the rotation member 82 cannot be rotated until the nozzle unit 10 is moved so as to fit the position of the cam follower 56 with the position of the horizontal lateral groove. In other words, the nozzle unit must be moved for engaging the cam follower with the lateral groove that is fixed in position because the winding position of the nozzle 5 with respect to the work differs depending upon the kind of work (due to difference of the height of works in the rotation axis direction).

In contrast, according to the configuration of this embodiment, since the cam follower 56 always engages with the longitudinal groove 66 during the winding operation, the aforementioned useless movement of the nozzle unit for fitting the position of the cam follower with the position of the lateral groove becomes unnecessary. Thus, the efficiency of the winding operation can be improved.

The engagement of the outer movement member 26 with the inner unit-drive means 54 can be done by using a columnar projection without using the cam follower 56. However, if the cam follower 56 is used, the friction between the members can be reduced and thus the turning movement of the nozzle 5 (rotation movement of the rotation member 82) becomes smooth.

In this embodiment, the tip position of the nozzle 5 is kept at the fixed position while the nozzle 5 is moved and turned between the winding state and the line processing state of the nozzle 5. This operation is performed by controlling the movement in the upper and lower direction (Z direction) of the nozzle unit 10 by the motor 30 of the nozzle-vertical movement mechanism 12, the turning operation of the nozzle holder 72 by the motor 48 of the nozzle-turning apparatus 7, and the movement in the horizontal right and left direction (Y direction) of the nozzle unit 10 by the motor 36 of the nozzle-horizontal movement mechanism 14 by means of control means (not shown).

Hereinafter, the operation of keeping the tip position of the nozzle 5 at the fixed position will be described with reference to FIG. 7. FIG. 7(a) shows a horizontal posture state of the nozzle 5 where the nozzle is in the winding state. That is, the nozzle 5 is in the horizontal posture of the winding state after the winding to one of the magnetic poles 88 of the work 86 is completed. The winding to the magnetic pole 88 is performed by the movement in the upper and lower direction (Z direction) of the nozzle unit 10, by the rotation (turning) of the work 88 by the work holding unit 6, and by the movement (pitch feeding) in the horizontal right and left direction (Y direction) of the work 86 by the work holding unit 6. That is, the winding is performed by the control of the motor 30 of the nozzle-vertical movement mechanism 12 and the motor 20 of the work holding unit 6. The above-mentioned control method is one example but various control methods may be adopted. For example, the winding of the wire to the magnetic pole may be performed by the control of the upper and lower direction movement and the horizontal right and left direction movement of the nozzle unit 10, and only the pitch feeding of the work may be performed by the control of the movement of the work holding unit 6. In other words, the winding is made by relative movement of the nozzle unit 10 and the work holding unit 6.

The winding machine 2 according to this embodiment is in idling state while the work holding unit 6 extracts a wound work from the work holding jig 18 and sets a next unwound work to this work holding jig 18. When the unwound work is set to the work holding jig 18, the work holding unit 6 moves to the horizontal right and left direction (Y direction) and thus the work 86 is placed at the opposed position downward the nozzle unit 10. Then, the nozzle unit 10 lowers and a winding is performed at the predetermined position.

When the winding to the one magnetic pole 88 is completed, the turning of the nozzle holder 72 starts in synchronization with the upward movement of the nozzle unit 10, and also the work holding unit 6 moves in the horizontal direction. These movements are controlled by the control means (not shown). According to this control, the nozzle 5 is turned with keeping its tip position at the substantially fixed position and finally set in the vertical posture that is the line processing state as shown in FIG. 7(b). Because no slack of the wire occurs with the turning of the nozzle 5, yield loss of the product caused by such as entwining mistake can be restrained. After the nozzle 5 is controlled in the vertical posture, the index operation of the work 86 by the control of the motor 20 of the work holding unit 6 is performed and then the nozzle 5 moves to the next aspect with keeping in the state of the vertical posture. For setting the nozzle 5 to the horizontal position after having moved to the next aspect, operations reversed to the abovementioned operations are performed.

Although, in the aforementioned embodiment, the projected (convex) portion is provided on the inner unit-drive means 54 and the concave groove or the via hole (concave portion) that engages with the projected portion is provided on the outer movement member 26, in the modification, the projected portion may be provided on the outer movement member 26 and the concave groove or the via hole that engages with the projected portion is provided on the inner unit-drive means 54. That is, the projected portion and the concave groove or the via hole are relatively provided between the inner unit-drive means 54 and the outer movement member 26.

Also, although, in the aforementioned embodiment, the rotation axis direction of the work is defined as the upper and lower direction, in the modification, the rotation axis direction of the work may be defined as the horizontal right and left direction.

Many widely different embodiments of the present invention may be constructed without departing from the spirit and scope of the present invention. It should be understood that the present invention is not limited to the specific embodiments described in the specification, except as defined in the appended claims.

INDUSTRIAL APPLICABILITY

The present invention is applicable to winding machines of automotive electrical rotating machines, electrical rotating machines for household electrical goods and electrical rotating machines of every other field, and to winding machines of every article that is necessary for windings.

DENOTATION OF REFERENCE NUMERALS

2: windings machine
4: base
5: nozzle
6: work holding unit
7: nozzle-turning apparatus
8: vertical frame
10: nozzle unit
12: nozzle-vertical movement mechanism
14: nozzle-horizontal movement mechanism
16: work base
18: work holding jig
20, 30, 36, 48: motor
22, 42, 50: feed screw
24, 44, 49: guide rail
26: outer movement member
28: drive mechanism
32, 38: driven shaft
34, 40, 52: belt
46: frame
53: nut member
54: inner unit-drive means
55: outer unit-drive means
56: cam follower
58: support member
60: screw
62: guide plate
64: bracket
66: longitudinal groove
68: unit body
70: shaft
72: nozzle holder
72a, 82a: engagement slot
74: nozzle-holder drive member
75: wire
76, 84: pivot pin
77: guide roller
80: arm member
82: rotation member
86: work
88: magnetic pole

The invention claimed is:

1. A nozzle turning apparatus including a nozzle unit that has a nozzle for sending out a wire from a tip end thereof and a nozzle holder for holding said nozzle, said nozzle unit rotatably supporting said nozzle holder, and a nozzle-holder drive member integrally provided with said nozzle unit and moved in said nozzle unit to rotate said nozzle holder, said nozzle-holder drive member being driven to turn said nozzle from a winding state to a wire processing state after a winding operation is finished, wherein said nozzle turning apparatus comprises:
inner unit-drive means integrally provided with said nozzle unit in said nozzle unit, for moving said nozzle-holder drive member; and
outer unit-drive means independently provided from said nozzle unit outside said nozzle unit, for driving said inner unit-drive means so as to move said nozzle-holder drive member.

2. The nozzle turning apparatus as claimed in claim 1, wherein said inner unit-drive means comprises a rotation member rotatably supported by said nozzle unit, for moving said nozzle-holder drive member, and a projected portion integrally provided with said rotation member, for rotating said rotation member; and wherein said outer unit-drive means comprises an outer movement member having a concave portion that engages with said projected portion, for moving to rotate said rotation member, and a drive mechanism for moving said outer movement member.

3. The nozzle turning apparatus as claimed in claim 2, wherein said outer movement member is configured to linearly move, wherein said concave portion of said outer movement member is constituted by an elongate groove or an elongate hole provided along a movement direction of said nozzle unit moves during a winding operation, and wherein a length of said elongate groove or said elongate hole is set to a value equal to or longer than a stroke of the movement of said nozzle unit during the winding operation.

4. The nozzle turning apparatus as claimed in claim 2, wherein said projected portion is constituted by a cam follower.

5. The nozzle turning apparatus as claimed in claim 2, wherein said drive mechanism comprises a rotation motor or a rotation air cylinder as a drive source.

6. A winding machine provided with a nozzle turning apparatus including a nozzle unit that has a nozzle for sending out a wire from a tip end thereof and a nozzle holder for holding said nozzle, said nozzle unit rotatably supporting said nozzle holder, and a nozzle-holder drive member integrally provided with said nozzle unit and moved in said nozzle unit to rotate said nozzle holder, said nozzle-holder drive member being driven to turn said nozzle from a winding state to a wire processing state after a winding operation is finished, wherein said nozzle turning apparatus comprises:
inner unit-drive means integrally provided with said nozzle unit in said nozzle unit, for moving said nozzle-holder drive member; and
outer unit-drive means independently provided from said nozzle unit outside said nozzle unit, for driving said inner unit-drive means so as to move said nozzle-holder drive member.

7. The winding machine as claimed in claim 6, wherein said inner unit-drive means comprises a rotation member rotatably supported by said nozzle unit, for moving said nozzle-holder drive member, and a projected portion integrally provided with said rotation member, for rotating said rotation member; and wherein said outer unit-drive means comprises an outer movement member having a concave portion that engages with said projected portion, for moving to rotate said rotation member, and a drive mechanism for moving said outer movement member.

8. The winding machine as claimed in claim 7, wherein said outer movement member is configured to linearly move, wherein said concave portion of said outer movement member is constituted by an elongate groove or an elongate hole provided along a movement direction of said nozzle unit moves during a winding operation, and wherein a length of said elongate groove or said elongate hole is set to a value equal to or longer than a stroke of the movement of said nozzle unit during the winding operation.

9. The winding machine as claimed in claim 7, wherein said projected portion is constituted by a cam follower.

10. The winding machine as claimed in claim 7, wherein said drive mechanism comprises a rotation motor or a rotation air cylinder as a drive source.

11. The winding machine as claimed in claim 6, wherein said winding machine is configured to control the movement of said outer unit-drive means and said nozzle unit so that a position of the tip end of said nozzle will not displace while the turning operation of said nozzle.

* * * * *